(12) United States Patent
Dai et al.

(10) Patent No.: US 11,809,299 B2
(45) Date of Patent: Nov. 7, 2023

(54) PREDICTING STORAGE ARRAY CAPACITY

(71) Applicant: DELL PRODUCTS, LP, Round Rock, TX (US)

(72) Inventors: Cherry Changyue Dai, Chengdu (CN); Arthur Fangbin Zhou, Chengdu (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/330,975

(22) Filed: May 26, 2021

(65) Prior Publication Data
US 2022/0334945 A1 Oct. 20, 2022

(30) Foreign Application Priority Data

Apr. 16, 2021 (CN) .......................... 202110413675.9

(51) Int. Cl.
*G06F 11/34* (2006.01)
*G06F 3/06* (2006.01)
*G06F 11/30* (2006.01)

(52) U.S. Cl.
CPC ........ *G06F 11/3442* (2013.01); *G06F 3/0604* (2013.01); *G06F 3/0653* (2013.01); *G06F 3/0673* (2013.01); *G06F 11/3034* (2013.01)

(58) Field of Classification Search
CPC .. G06F 11/3442; G06F 3/0604; G06F 3/0653; G06F 3/0673; G06F 11/3034
See application file for complete search history.

(56) References Cited

U.S. PATENT DOCUMENTS

| 2016/0226972 A1* | 8/2016 | Mahankali | ............ G06F 3/0647 |
| 2021/0279272 A1* | 9/2021 | Canessa | .................. G06F 16/51 |
| 2021/0334021 A1* | 10/2021 | Devasigamony | ....... G06F 3/067 |

FOREIGN PATENT DOCUMENTS

WO 2012167108 A1 12/2012

* cited by examiner

*Primary Examiner* — Masud K Khan
(74) *Attorney, Agent, or Firm* — Larson Newman, LLP

(57) ABSTRACT

An information handling system includes a storage system and a remote processing system. The storage system includes a storage array and a local storage usage predictor. The local storage usage predictor receives usage information from the storage array, and predicts a first usage prediction for the storage array based upon the usage information. The remote processing system includes a remote storage usage predictor remote from the storage system. The remote storage usage predictor receives the usage information and to predicts a second usage prediction for the storage array based upon the usage information.

20 Claims, 5 Drawing Sheets

PREDICTING STORAGE ARRAY CAPACITY

FIELD OF THE DISCLOSURE

This disclosure generally relates to information handling systems, and more particularly relates to storage array capacity in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a storage system and a remote processing system. The storage system includes a storage array and a local storage usage predictor. The local storage usage predictor may receive usage information from the storage array and predict a first usage prediction for the storage array based upon the usage information. The remote processing system may include a remote storage usage predictor remote from the storage system. The remote storage usage predictor may receive the usage information and to predict a second usage prediction for the storage array based upon the usage information.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
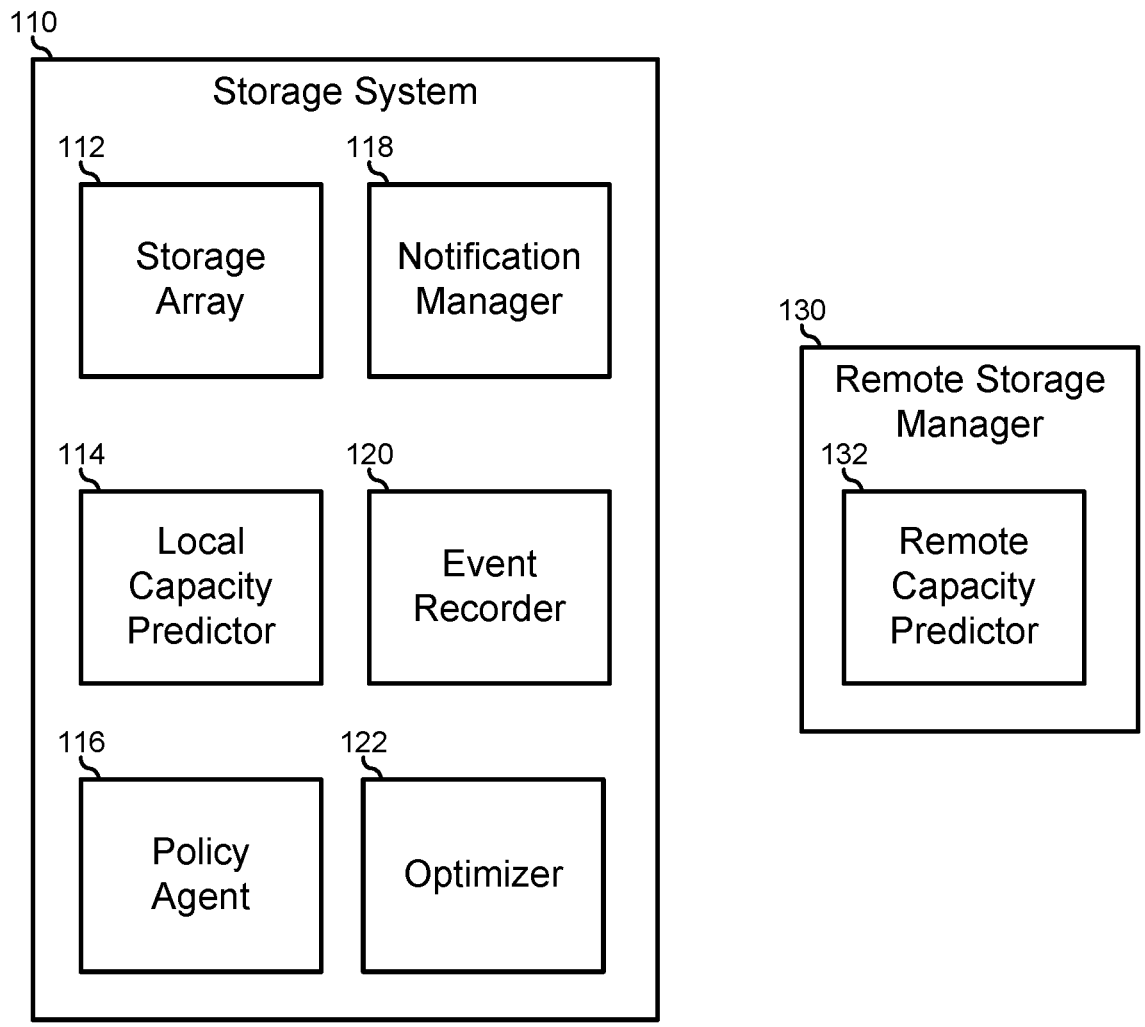
FIG. 1 is a block diagram illustrating a storage management system according to an embodiment of the current disclosure.

FIG. 1 illustrates a storage management system 100 including a storage system 110 and a remote storage manager 120. Storage system 110 includes a storage array 112, a local capacity predictor 114, a policy agent 116, a notification manager 118, an event recorder 120, and an optimizer 122. Remote storage manager 130 includes a remote capacity predictor 132. In a typical storage management system, alerts are provided when a storage resource, such as a disk drive in a storage array, is reaching an alert threshold, such as a storage capacity threshold or a data bandwidth threshold. However, such last-minute alerts typically do not allow for enough warning time to increase the storage capacity of the storage array in order to prevent running out of storage space in the storage array. This can be somewhat mitigated by setting lower storage capacity limit and data bandwidth limit thresholds. However, setting lower limits may have the unintended consequence of unnecessarily increasing the number of alerts that are provided by the storage management system.

Various machine learning and event and threshold modeling may be utilized to attempt to improve the predictions provided by the alerts. In particular, simple modeling, such as linear regression modeling, may be used, but such simple modeling is typically not sufficient to account for multiple scenarios and complex event modeling. More complex modeling may be utilized to account for more varied scenarios and more complex event modeling, but such solutions typically require huge data and processing capacity which then limits the usable storage space and processing capacity of the storage management system. Moreover, such complex models do not typically provide real-time predictions.

In a particular embodiment, a hybrid prediction model is applied to storage management system 100, where a lightweight predictive model is instantiated on storage system 110, and a more complex, resource intensive predictive model is instantiated at remote storage manager 130. In particular, the local lightweight predictive model instantiated on storage system 110 utilizes a relatively small history data set, and simple predictive algorithms to provide real-time short term predictions of the data storage capacity of storage array 112 and of data bandwidth for the storage array. The lightweight predictive model is well adapted to providing emergency use case predictions, such that an administrator of storage management system 100 for can take short-term remedial actions, such as powering on additional storage servers, migrating workloads, suspending inactive workloads, or the like.

The lightweight predictive model may utilize linear regression modeling, auto regression (AR), moving average (MA), auto-regressive integrated moving average (ARIMA), or the like, which are known to provide satisfactory results for short term predictions of the needs of storage management system 100. In a particular embodiment, the lightweight predictive model utilizes a variety of different algorithms to determine a best fit for the data at hand. As such, events that occur that are local to storage system 100 can be quickly accounted for and incorporated into determining the best fitting algorithm.

Examples of local events include installation or removal of hard drives, the failure of one or more hard drive, the reallocation of storage partitions, and the like. Here, prediction timeframes may be provided for daily update, weekly update, hourly update, or the like. Thus the lightweight predictive model is termed the "lightweight" both in terms of the type of algorithm utilized, and in terms of the amount of processing resources needed by storage system 110 to implement the algorithm. As such, storage management system 100 obtains good short term storage prediction performance without unnecessarily burdening the processing resources of storage system 110.

The resource intensive predictive module is well adapted to providing long term storage predictions, such as purchasing and installing additional storage assets, or the like. Here, greater processing resources outside of storage system 110, such as a network or datacenter server, a cloud processing system, or the like, are utilized to do more complex predictive processing to more accurately model the behavior of storage system 110. Here, it will be understood that the processing capacity are greater, and the time constraints are more relaxed as compared with the lightweight predictive model. The resource intensive predictive model may utilize long-short term memory (LSTM) modeling, a gradient boosting framework such as XGBoost or the like, or other more resource intensive predictive models, as needed or desired. Further, the resource intensive predictive model may utilize more extensive factors, such as data reduction percentages, snap numbers, snap size, average snapshot retention, replication session numbers, replication average recovery point objective (RPO), I/O patterns, and the like. Here, prediction timelines may be provided for monthly update, quarterly update, or the like Returning to FIG. 1, storage array 112 represents the data storage media of storage system 110, such as hard disk drives (HDDs), solid state drives (SSDs), tape backup, or other storage media as needed or desired. Storage array 112 may represent storage media in accordance with one or more data storage standards, such as SCSI storage devices, Fibre-Channel storage devices, or the like. Local capacity predictor 114 implements the lightweight predictive model to generate quick short term capacity predictions for storage system 110. Policy agent 116 defines policy conditions for the predictions provided by local capacity predictor 114.

In particular, policy agent 116 defines the interval for collecting data on the condition of storage array 112, the prediction frequency, the default predictive model utilized in making the short term prediction, thresholds such as data capacity thresholds or bandwidth capacity, optimization policies such as a number of optimization attempts to try, the order of use of the various predictive models, conditions for determining the optimized predictive model, optimization order, the optimization condition, and the like. A table of example policy conditions is given in Table 1, below.

TABLE 1

Example Policy Conditions

| Policy | Example |
|---|---|
| Data Collection Interval | Per day, per hour |
| Prediction Period | Next week, next day |
| Default Model | Linear Regression |
| Evaluation Threshold | Model Evaluation passed when MSE value is smaller 1.5 |
| Optimization policy | |
| Optimization Attempts | No more than 3 attempts |
| Optimization Condition | Optimization triggered when CPU utilization is less than <60% |
| Optimization Order | Rebuild default model with a subset of history data. If it does not fit, use ARIMA model |

Notification manager 118 operates to generate notifications based upon the short term prediction. In a particular embodiment, notification manager 118 also generates notifications based upon the long term prediction as described above. Event recorder 120 operates to record the events in storage system 110 that affect the local prediction, such as the addition or removal of storage media from storage array 110, the deletion from, or migration to the storage array of large storage objects, or the like. Optimizer 122 optimizes local capacity predictor 114 when the selected model does not pass the evaluation.

In particular, when the selected model does not pass the evaluation, optimizer 122 may operate to narrow the range of historical data evaluated by local capacity predictor 114, to determine if system events have occurred which might cause the model to fail the evaluation, to select different predictive algorithms, or the like, in order to arrive at a better optimization from the local capacity predictor. Remote capacity predictor 132 implements the resource intensive predictive model as described above.

Figure 2:
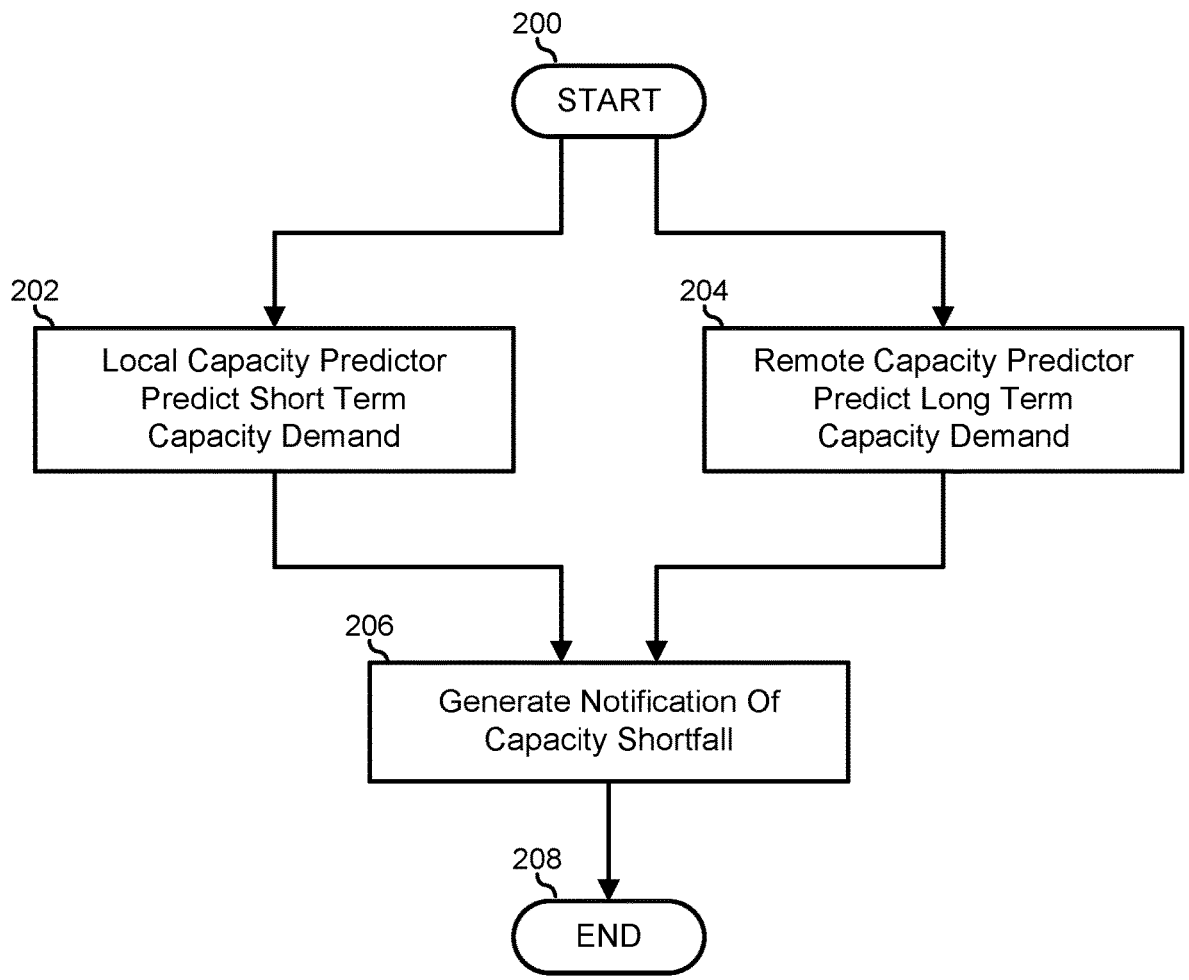
FIG. 2 is a flowchart illustrating a method for predicting storage capacity in a storage system according to an embodiment of the current disclosure.

FIG. 2 illustrates a method for predicting storage capacity in a storage system, starting at block 200. A short term storage capacity prediction is provided by a capacity predictor that is local to the storage system in block 202, and a long term storage capacity prediction is provided by a capacity predictor that is remote from the storage system in block 204. Notifications based upon the predictions made in blocks 202 and 204 are made when the respective predictions indicate a capacity shortfall in block 206, and the method ends in block 208.

Figure 3:
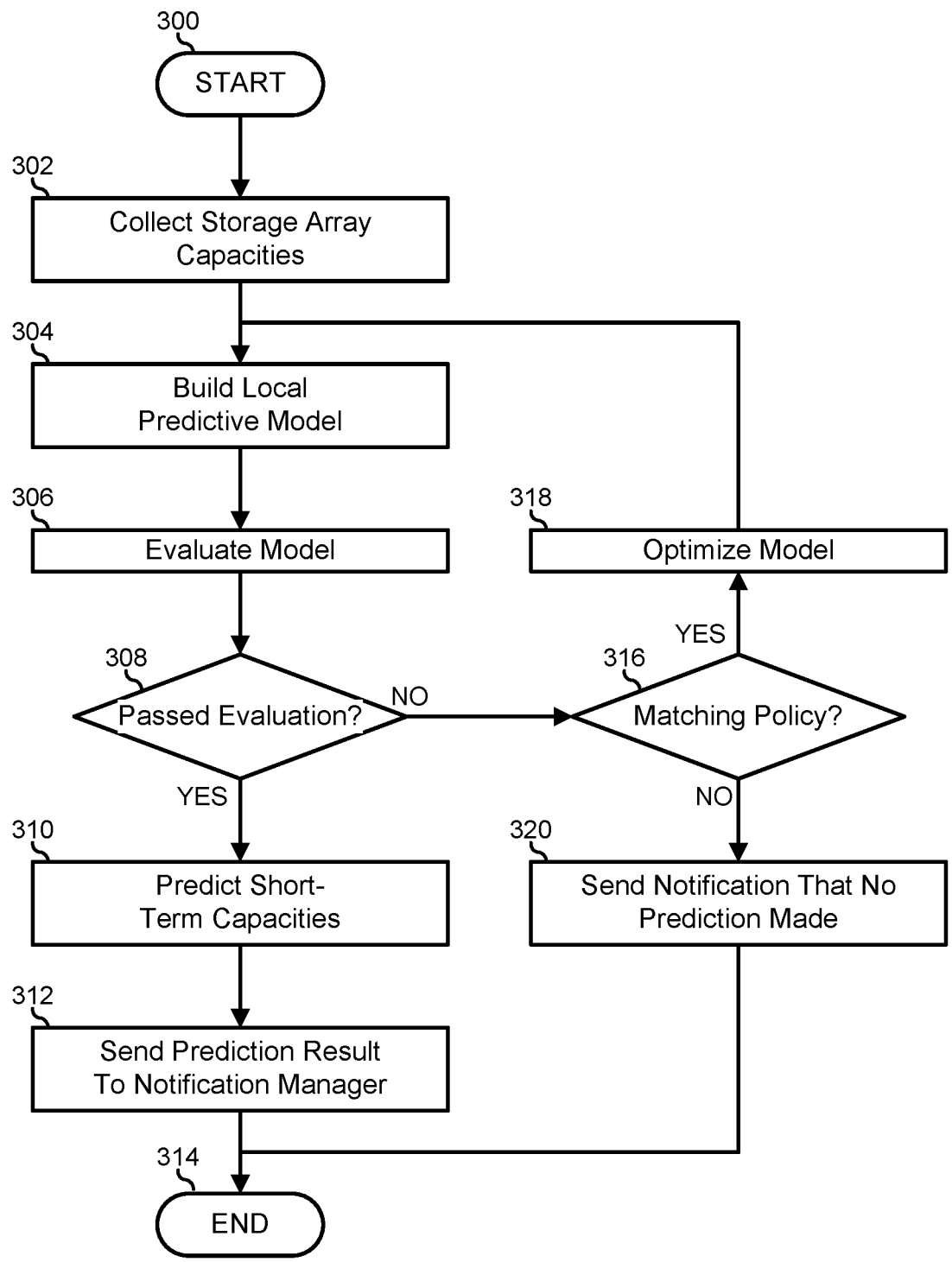
FIG. 3 is a flowchart illustrating a method for making a local capacity prediction according to an embodiment of the current disclosure.

FIG. 3 illustrates a method for making a local capacity prediction, starting at block 300. The data for a storage array is collected in block 302. For example, the storage utilization or available storage utilization, the data bandwidth, and the like, can be collected in accordance with a policy agent, such as at a pre-defined interval, for a predefined duration, or the like. A local predictive model is built in block 204. For example, the default predictive model may include a linear regression algorithm. The selected model is evaluated with the collected data in block 306. For example, the selected model may be evaluated a root-mean squared value (RMS), a root-mean square error (RMSE) value, an R2 value, or the like. A decision is made as to whether or not the model passed the evaluation in decision block 308. For example, an RMS value may be determined to have passed the evaluation when the value is within a threshold, where the R2 value is greater than a minimum value, or the like.

If the model passed the evaluation, the "YES" branch of decision block 308 is taken, a short term capacity prediction is made in block 310, the short term prediction is passed to a notification manager in block 312, and the method ends in block 314. If the model did not pass the evaluation, the "NO" branch of decision block 308 is taken and a decision is made as to whether or not the model matches a policy in block 316. For example, a policy agent may determine if a number of attempts to determine a prediction value exceeds a threshold, or may determine that a processor utilization is less than another threshold. If the model matches the policy, the "YES" branch of decision block 316 is taken, the model is optimized in block 318, and the method returns to block 304. If the model does not match the policy, the "NO" branch of decision block 316 is taken, a notification that no prediction was made is sent in block 320, and the method ends in block 314.

Figure 4:
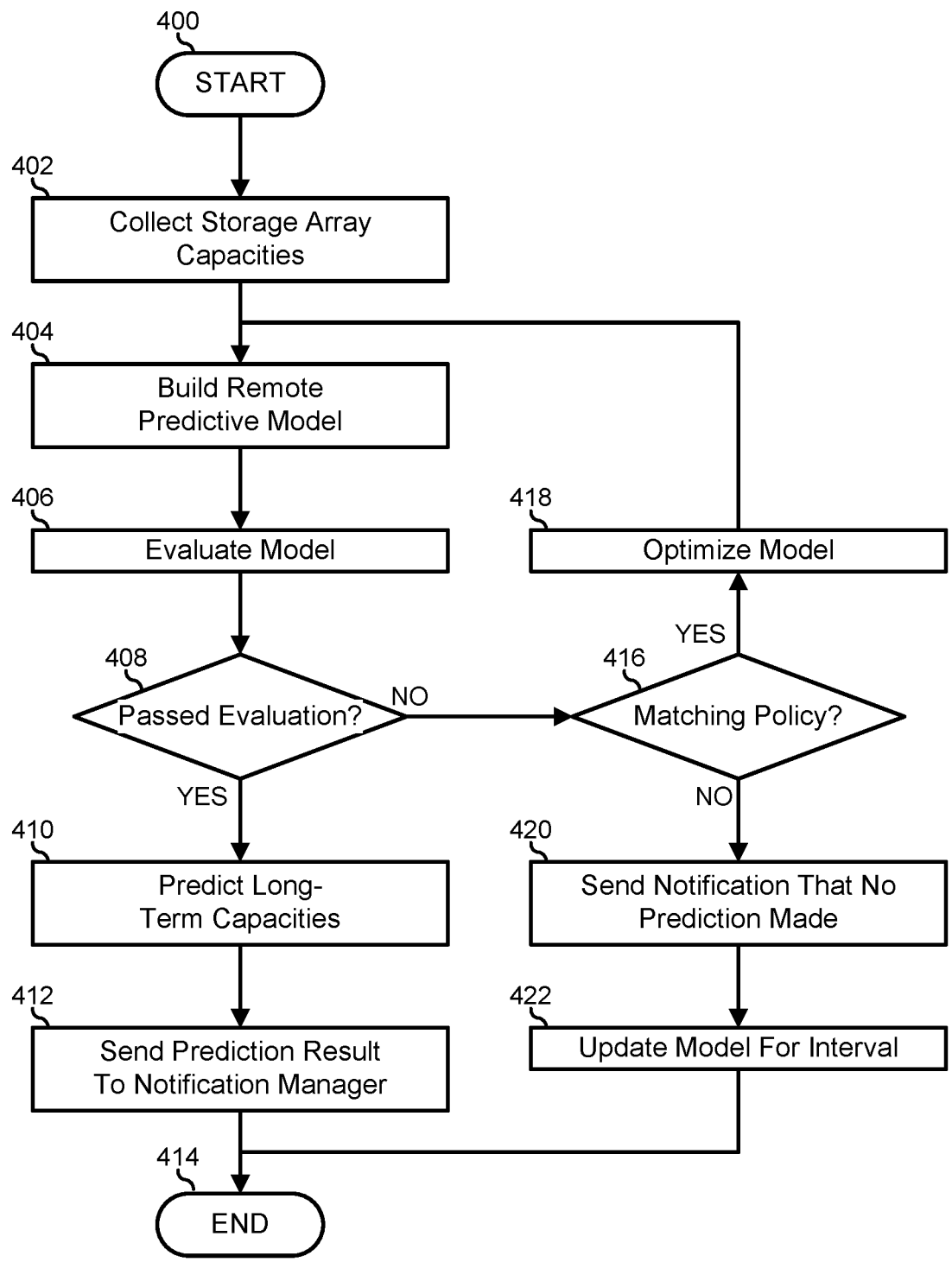
FIG. 4 is a flowchart illustrating a method for making a local capacity prediction according to an embodiment of the current disclosure.

FIG. 4 illustrates a method for making a local capacity prediction, starting at block 400. The data for a storage array is collected in block 402. A remote predictive model is built in block 204. For example, the default predictive model may include a LSTM algorithm. The selected model is evaluated with the collected data in block 406. For example, the selected model may be evaluated a root-mean squared value (RMS), a root-mean square error (RMSE) value, an R2 value, or the like. A decision is made as to whether or not the model passed the evaluation in decision block 408. For example, an RMS value may be determined to have passed the evaluation when the value is within a threshold, where the R2 value is greater than a minimum value, or the like. If the model passed the evaluation, the "YES" branch of decision block 408 is taken, a long term capacity prediction is made in block 410, the short term prediction is passed to a notification manager in block 412, and the method ends in block 414.

If the model did not pass the evaluation, the "NO" branch of decision block 408 is taken and a decision is made as to whether or not the model matches a policy in block 416. For example, a policy agent may determine if a number of attempts to determine a prediction value exceeds a threshold, or may determine that a processor utilization is less than another threshold. If the model does not match the policy, the "NO" branch of decision block 416 is taken, the model is optimized in block 418, and the method returns to block 404. If the model does match the policy, the "YES" branch of decision block 416 is taken, a notification that no prediction was made is sent in block 420, the time interval for the model is updated in block 422, and the method ends in block 414.

Figure 5:
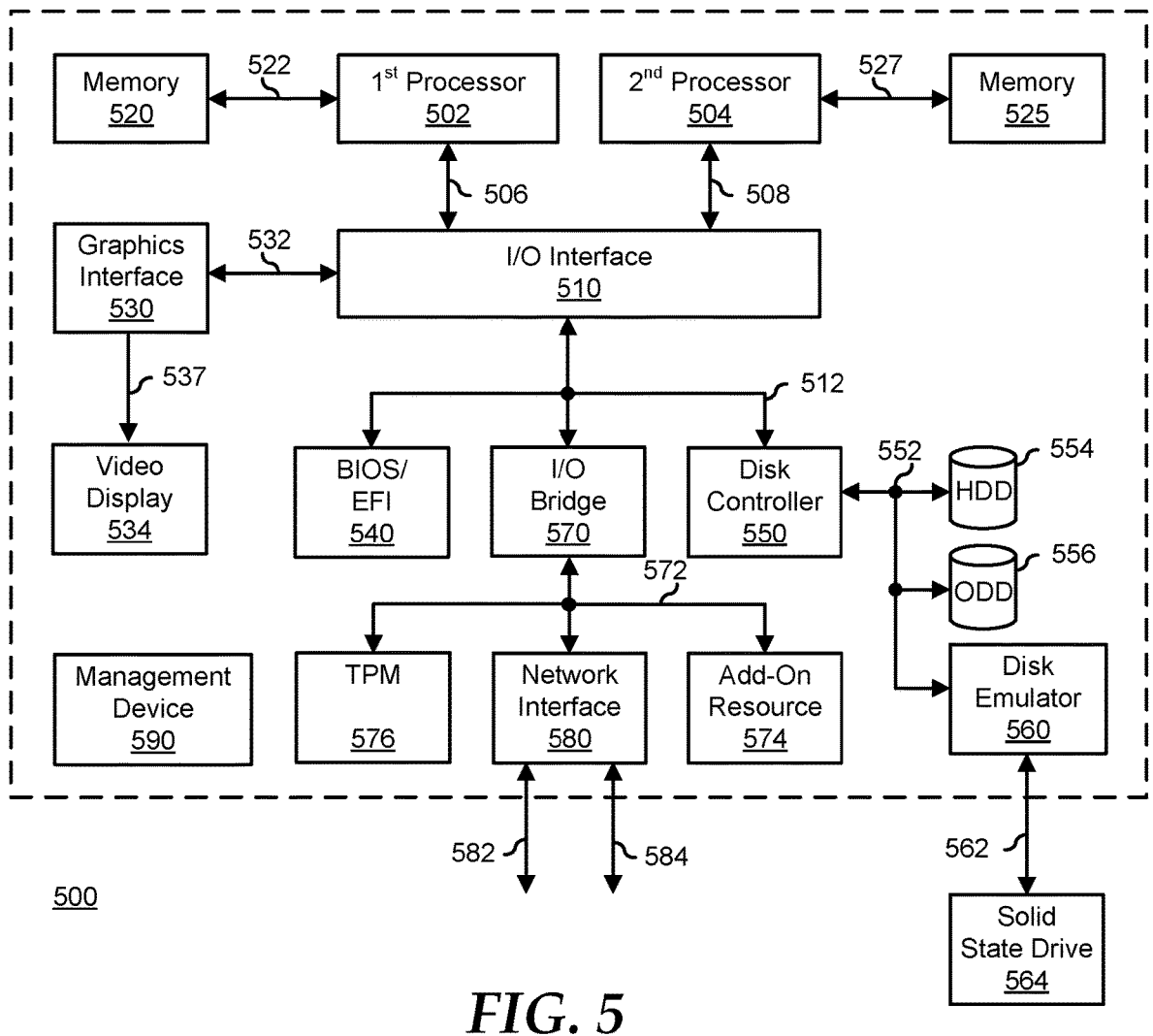
FIG. 5 is a block diagram illustrating a generalized information handling system according to another embodiment of the current disclosure.

FIG. 5 illustrates a generalized embodiment of an information handling system 500. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch router or other network communication device, or any other suitable device and may vary in size, shape, performance, functionality, and price.

Further, information handling system 500 can include processing resources for executing machine-executable code, such as a central processing unit (CPU), a programmable logic array (PLA), an embedded device such as a System-on-a-Chip (SoC), or other control logic hardware. Information handling system 500 can also include one or more computer-readable medium for storing machine-executable code, such as software or data. Additional components of information handling system 500 can include one or more storage devices that can store machine-executable code, one or more communications ports for communicating with external devices, and various input and output (I/O) devices, such as a keyboard, a mouse, and a video display. Information handling system 500 can also include one or more buses operable to transmit information between the various hardware components.

Information handling system 500 can include devices or modules that embody one or more of the devices or modules described below, and operates to perform one or more of the methods described below. Information handling system 500 includes a processors 502 and 504, an input/output (I/O) interface 510, memories 520 and 525, a graphics interface 530, a basic input and output system/universal extensible firmware interface (BIOS/UEFI) module 540, a disk controller 550, a hard disk drive (HDD) 554, an optical disk drive (ODD) 556, a disk emulator 560 connected to an external solid state drive (SSD) 562, an I/O bridge 570, one or more add-on resources 574, a trusted platform module (TPM) 576, a network interface 580, a management device 590, and a power supply 595. Processors 502 and 504, I/O interface 510, memory 520, graphics interface 530, BIOS/UEFI module 540, disk controller 550, HDD 554, ODD 556, disk emulator 560, SSD 562, I/O bridge 570, add-on resources 574, TPM 576, and network interface 580 operate together to provide a host environment of information handling system 500 that operates to provide the data processing functionality of the information handling system. The host environment operates to execute machine-executable code, including platform BIOS/UEFI code, device firmware, operating system code, applications, programs, and the like, to perform the data processing tasks associated with information handling system 500.

In the host environment, processor 502 is connected to I/O interface 510 via processor interface 506, and processor 504 is connected to the I/O interface via processor interface 508. Memory 520 is connected to processor 502 via a memory interface 522. Memory 525 is connected to processor 504 via a memory interface 527. Graphics interface 530 is connected to I/O interface 510 via a graphics interface 532, and provides a video display output 536 to a video display 534. In a particular embodiment, information handling system 500 includes separate memories that are dedicated to each of processors 502 and 504 via separate memory interfaces. An example of memories 520 and 530 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 540, disk controller 550, and I/O bridge 570 are connected to I/O interface 510 via an I/O channel 512. An example of I/O channel 512 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 510 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/UEFI module 540 includes BIOS/UEFI code operable to detect resources within information handling system 500, to provide drivers for the resources, initialize the resources, and access the resources. BIOS/UEFI module 540 includes code that operates to detect resources within information handling system 500, to provide drivers for the resources, to initialize the resources, and to access the resources.

Disk controller 550 includes a disk interface 552 that connects the disk controller to HDD 554, to ODD 556, and to disk emulator 560. An example of disk interface 552 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 560 permits SSD 564 to be connected to information handling system 500 via an external interface 562. An example of external interface 562 includes a USB interface, an IEEE 1394 (Firewire) interface, a proprietary interface, or a combination thereof. Alternatively, solid-state drive 564 can be disposed within information handling system 500.

I/O bridge 570 includes a peripheral interface 572 that connects the I/O bridge to add-on resource 574, to TPM 576, and to network interface 580. Peripheral interface 572 can be the same type of interface as I/O channel 512, or can be a different type of interface. As such, I/O bridge 570 extends the capacity of I/O channel 512 when peripheral interface 572 and the I/O channel are of the same type, and the I/O bridge translates information from a format suitable to the I/O channel to a format suitable to the peripheral channel 572 when they are of a different type. Add-on resource 574 can include a data storage system, an additional graphics interface, a network interface card (NIC), a sound/video processing card, another add-on resource, or a combination thereof. Add-on resource 574 can be on a main circuit board, on separate circuit board or add-in card disposed within information handling system 500, a device that is external to the information handling system, or a combination thereof.

Network interface 580 represents a NIC disposed within information handling system 500, on a main circuit board of the information handling system, integrated onto another component such as I/O interface 510, in another suitable location, or a combination thereof. Network interface device 580 includes network channels 582 and 584 that provide interfaces to devices that are external to information handling system 500. In a particular embodiment, network channels 582 and 584 are of a different type than peripheral channel 572 and network interface 580 translates information from a format suitable to the peripheral channel to a format suitable to external devices. An example of network channels 582 and 584 includes InfiniBand channels, Fibre Channel channels, Gigabit Ethernet channels, proprietary channel architectures, or a combination thereof. Network channels 582 and 584 can be connected to external network resources (not illustrated). The network resource can include another information handling system, a data storage system, another network, a grid management system, another suitable resource, or a combination thereof.

Management device 590 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 500. In particular, management device 590 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 500, such as system cooling fans and power supplies. Management device 590 can include a network connection to an external management system, and the management device can communicate with the management system to report status information for information handling system 500, to receive BIOS/UEFI or system firmware updates, or to perform other task for managing and controlling the operation of information handling system 500. Management device 590 can operate off of a separate power plane from the components of the host environment so that the management device receives power to manage information handling system 500 when the information handling system is otherwise shut down. An example of management device 590 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 590 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. An information handling system, comprising:
a storage system including a storage array and a local storage usage predictor, the local storage usage predictor configured to receive usage information from the storage array, and to predict a first usage prediction for the storage array based upon the usage information; and
a remote processing system including a remote storage usage predictor remote from the storage system, the remote storage usage predictor configured to receive the usage information and to predict a second usage prediction for the storage array based upon the usage information.

2. The information handling system of claim 1, wherein the local storage usage predictor predicts the first usage prediction based upon at least one of a linear regression model, an auto regression (AR) model, a moving average (MA) model, and an auto-regressive integrated moving average (ARIMA) model.

3. The information handling system of claim 2, wherein the local storage usage predictor is further configured to utilize each of the linear regression model, the AR model, the MA model, and the ARIMA model in predicting the first usage prediction.

4. The information handling system of claim 2, wherein the local storage usage predictor is further configured to utilize the linear regression model as a default prediction model in predicting the first usage prediction, to determine that the first usage prediction has not passed an evaluation criteria, and to utilize a second one of the AR model, the MA model, and the ARIMA model to predict a third usage prediction for the storage array based upon the usage information.

5. The information handling system of claim 1, wherein the local storage usage predictor is further configured to determine an event associated with the storage array, wherein the first usage prediction is further based upon the event.

6. The information handling system of claim 5, wherein the event includes one of a storage capacity of the storage array increasing, the storage capacity of the storage array decreasing, an image object migrating into the storage array, and the image object migrating out of the storage array.

7. The information handling system of claim 1, wherein the remote storage usage predictor predicts the long term usage prediction based upon at least one of a long-short term memory model and a gradient boosting framework model.

8. The information handling system of claim 1, wherein the usage information includes one of a current storage capacity of the storage array and a current bandwidth of the storage array.

9. The information handling system of claim 8, wherein the first usage prediction includes one of a storage capacity prediction and a data bandwidth prediction of the storage array.

10. The information handling system of claim 1, wherein the first usage prediction is for a shorter duration than the second usage prediction.

11. A method, comprising:
receiving, by a local storage usage predictor of a storage system, usage information from a storage array of the storage system;
predicting, by the local storage usage predictor, a first usage prediction for the storage array based upon the usage information;
receiving, by a remote storage usage predictor remote from the storage system, the usage information; and
predicting, by the remote storage usage predictor, a second usage prediction for the storage array based upon the usage information, wherein the first usage prediction is for a shorter duration than the second usage prediction.

12. The method of claim 11, wherein the local storage usage predictor predicts the first usage prediction based upon at least one of a linear regression model, an auto regression (AR) model, a moving average (MA) model, and an auto-regressive integrated moving average (ARIMA) model.

13. The method of claim 12, further comprising:
utilizing, by the local storage usage predictor, each of the linear regression model, the AR model, the MA model, and the ARIMA model in predicting the first usage prediction.

14. The method of claim 12, further comprising:
utilizing, by the local storage usage predictor, the linear regression model as a default prediction model in predicting the first usage prediction;
determining that the first usage prediction has not passed an evaluation criteria; and
utilizing a second one of the AR model, the MA model, and the ARIMA model to predict a third usage prediction for the storage array based upon the usage information.

15. The method of claim 11, further comprising:
determining, by the local storage usage predictor, an event associated with the storage array, wherein the first usage prediction is further based upon the event.

16. The method of claim 15, wherein the event includes one of a storage capacity of the storage array increasing, the storage capacity of the storage array decreasing, an image object migrating into the storage array, and the image object migrating out of the storage array.

17. The method of claim 11, wherein the remote storage usage predictor predicts the long term usage prediction based upon at least one of a long-short term memory (LSTM) model and a gradient boosting framework model.

18. The method of claim 11, wherein the usage information includes one of a current storage capacity of the storage array and a current bandwidth of the storage array.

19. The method of claim 18, wherein the first usage prediction includes one of a storage capacity prediction and a data bandwidth prediction of the storage array.

20. An information handling system, comprising:
a notification manager;
a storage system including a storage array and a local storage usage predictor, the local storage usage predictor configured to receive usage information from the storage array, to predict a first usage prediction for the storage array based upon the usage information, and to send the first usage prediction to the notification manager; and
a remote processing system including a remote storage usage predictor remote from the storage system, the remote storage usage predictor configured to receive the usage information, to predict a second usage prediction for the storage array based upon the usage information, and to send the second usage prediction to the notification manager;
wherein the notification manager is configured to provide a first notification based upon the first usage prediction and to provide a second notification based upon the second usage prediction.

* * * * *